United States Patent [19]

Lee et al.

[11] Patent Number: 5,650,986
[45] Date of Patent: Jul. 22, 1997

[54] OPTICAL PICKUP DRIVING APPARATUS FOR AN OPTICAL DISK DRIVE

[75] Inventors: Chul-woo Lee; Young-woong Kim, both of Seoul, Rep. of Korea

[73] Assignee: Samsung Electronics Co., Ltd., Kyungki-do, Rep. of Korea

[21] Appl. No.: 583,936

[22] Filed: Jan. 11, 1996

Related U.S. Application Data

[63] Continuation of Ser. No. 158,285, Nov. 29, 1993, abandoned.

[30] Foreign Application Priority Data

Nov. 30, 1992 [KR] Rep. of Korea ............... 92-22928

[51] Int. Cl.$^6$ ................................................ G11B 7/09
[52] U.S. Cl. ......................... 369/44.14; 369/44.16; 369/44.22; 359/814
[58] Field of Search ................... 369/44.14, 44.75, 369/44.16, 44.17, 44.18, 44.21, 44.22; 359/814, 824, 813, 823

[56] References Cited

U.S. PATENT DOCUMENTS

| | | | |
|---|---|---|---|
| 4,504,935 | 3/1985 | Jansen | 369/44.16 X |
| 4,538,882 | 9/1985 | Tanaka et al. | 369/44.16 X |
| 4,616,355 | 10/1986 | Kasahara | 369/44.16 |
| 4,804,835 | 2/1989 | Ando | 369/44.37 X |
| 5,043,964 | 8/1991 | Suzuki | 369/44.32 X |
| 5,195,074 | 3/1993 | Tomoshima et al. | 369/44.21 X |
| 5,212,673 | 5/1993 | Honda | 369/44.15 |
| 5,214,630 | 5/1993 | Goto et al. | 369/44.14 |
| 5,218,587 | 6/1993 | Nomiyama et al. | 369/44.22 X |
| 5,228,017 | 7/1993 | Matsuzaki et al. | 369/44.16 X |
| 5,293,363 | 3/1994 | Takeshita | 369/44.21 |
| 5,347,500 | 9/1994 | Eguchi | 369/44.22 X |

FOREIGN PATENT DOCUMENTS

| | | | |
|---|---|---|---|
| 0160843 | 7/1986 | Japan | 369/44.15 |
| 0168138 | 7/1986 | Japan | 369/44.22 |
| 0062333 | 3/1991 | Japan | 369/44.16 |

*Primary Examiner*—Thang V. Tran
*Attorney, Agent, or Firm*—Leydig, Voit & Mayer

[57] ABSTRACT

An optical pickup driving apparatus includes a carriage for a moving portion having an objective lens, a feeding motor having a moving coil for supporting the carriage, a magnet for producing a magnetic linked flux to the moving coil and a yoke member for controlling the magnetic path of the magnetic flux and movably supporting the moving coil, and a plurality of coils for minutely moving the objective lens vertically and horizontally in response to the magnet of the feeding motor. By reducing the weight of the moving portion mounted on the carriage, the feeding motor has a rapid response characteristic and therefore the optical pickup can search for information at high speed.

3 Claims, 4 Drawing Sheets

OPTICAL PICKUP DRIVING APPARATUS FOR AN OPTICAL DISK DRIVE

This disclosure is a continuation of U.S. patent application Ser. No. 08/158,285, filed Nov. 29, 1993, now abandoned.

BACKGROUND OF THE INVENTION

The present invention relates to an optical pickup driving apparatus for conveying an optical pickup for recording and reproducing in the diameter direction of a rotating optical disk so as to perform information seeking in an optical disk drive and particularly to an optical pickup driving apparatus with improved speed information seek operation.

With the development of the information industry, demand for processing information at higher speeds has been growing. In a compact disk player or magnetooptical disk drive, an optical disk is rotated by a spindle motor, and an optical pickup for recording and reproducing moves along a radius of the rotating disk so as to search for information thereon (called a coarse seek). In this structure, moving the whole optical pickup is unfavorable to high-speed seeking because of the burden of the feeding mechanism.

A conventional optical pickup, which is shown in FIG. 1, has a fixed portion 1 and a moving portion 2. To reduce the load of such an optical pickup, only moving portion 2 is mounted on a carriage 4 of a voice coil motor 3 which is a feeding mechanism. Moving portion 2 of the optical pickup essentially includes an actuator 8 for fine seek which minutely drives an objective lens 6 in the vertical and horizontal directions so that a beam spot converged by objective lens 6 precisely traces an accessed target track on a disk. The objective lens 6 for converges a light beam on optical disk 5 and a reflecting prism 7 for reflecting an incident beam and a reflected beam. However, since actuator 8 for fine seeking is composed of a plurality of coils, a permanent magnet and a yoke member, the actuator constitutes about half the overall weight of moving portion 2 and carriage 4. This greatly increases the load of voice coil motor 3. Accordingly, there is an upper limit to the speed of the seek operation in the conventional optical pickup driving apparatus.

SUMMARY OF THE INVENTION

Therefore, it is an object of the present invention to provide an optical pickup driving apparatus producing a magnetic flux required for an actuator from a voice coil, an optical-pickup feeding mechanism, eliminating the permanent magnet and a yoke of the prior art, actuator to greatly enhance information seek speed.

To accomplish the object of the present invention, there is provided an optical pickup driving apparatus, comprising a moving portion having an objective lens for converging a light beam on an optical disk, and a fixed portion for directing light to the objective lens and receiving light therefrom, the apparatus further comprising: a feeding motor having a carriage on which the moving portion is mounted, a moving coil for supporting the carriage, a magnet for producing a magnetic interlinkage flux to the moving coil, and a yoke member for forming the magnetic path of the magnetic flux and movably supporting the moving coil; and a fine-seek device for supporting the objective lens of the moving portion movably with respect to the carriage, and for minutely moving the objective lens vertically and horizontally according to the electromagnetic action of the magnet of the feeding motor.

The present invention greatly reduces the weight of an actuator for minutely driving an objective lens. The actuator is included in the moving portion of an optical pickup mounted on the carriage of the feeding motor of the optical pickup. For instance, the fine-seek actuator may be simplified by sharing the magnet and yoke member of the feeding motor and employing only a separate coil. This decreases the weight of the moving portion including the fine-seek actuator, and the load of the feeding motor, thereby enhancing the response characteristic of the feeding motor and enabling high-speed information seeking.

BRIEF DESCRIPTION OF THE DRAWINGS

The above object and other advantages of the present invention will become more apparent by describing in detail a preferred embodiment with reference to the attached drawings in which.

DETAILED DESCRIPTION OF THE INVENTION

Figure 1:
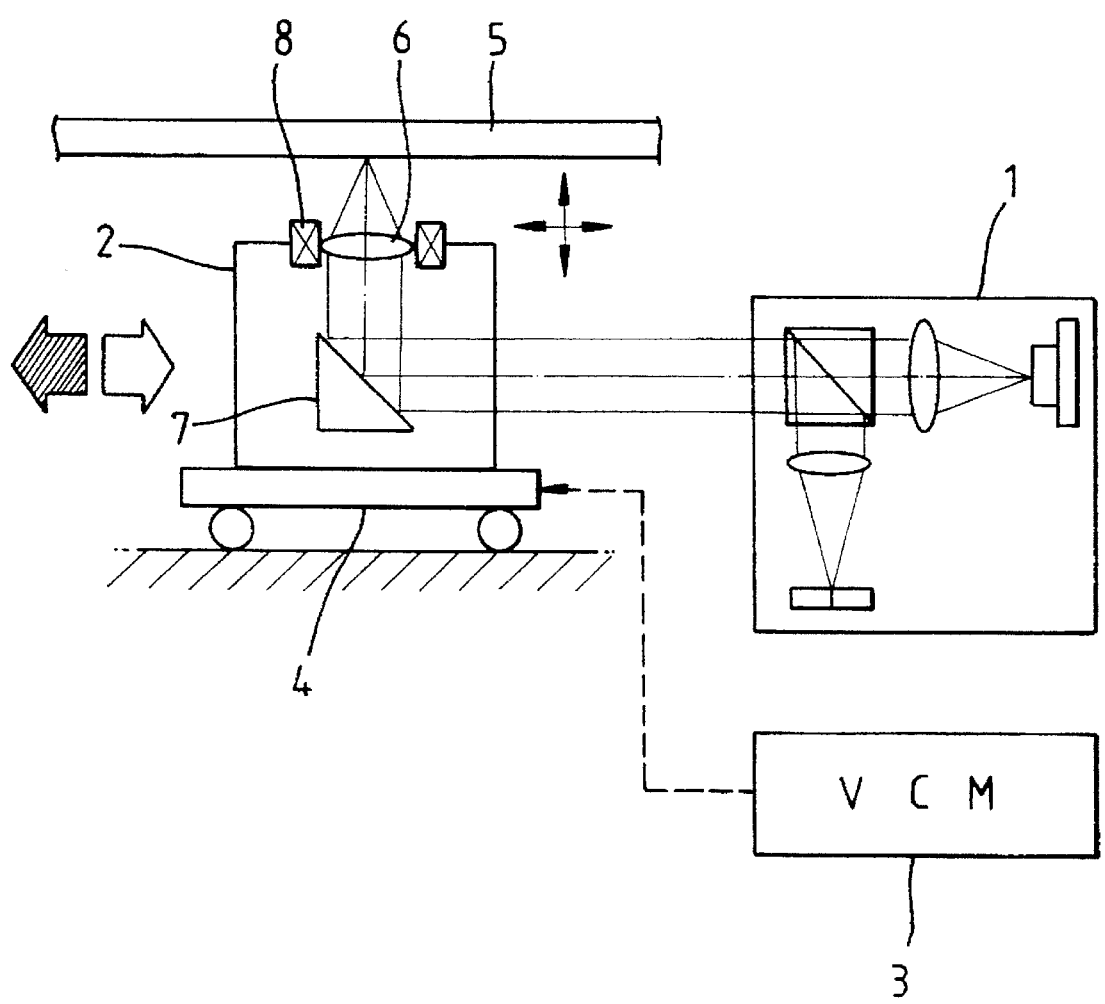
FIG. 1 illustrates a driving method and apparatus of a conventional optical pickup.
Figure 2:
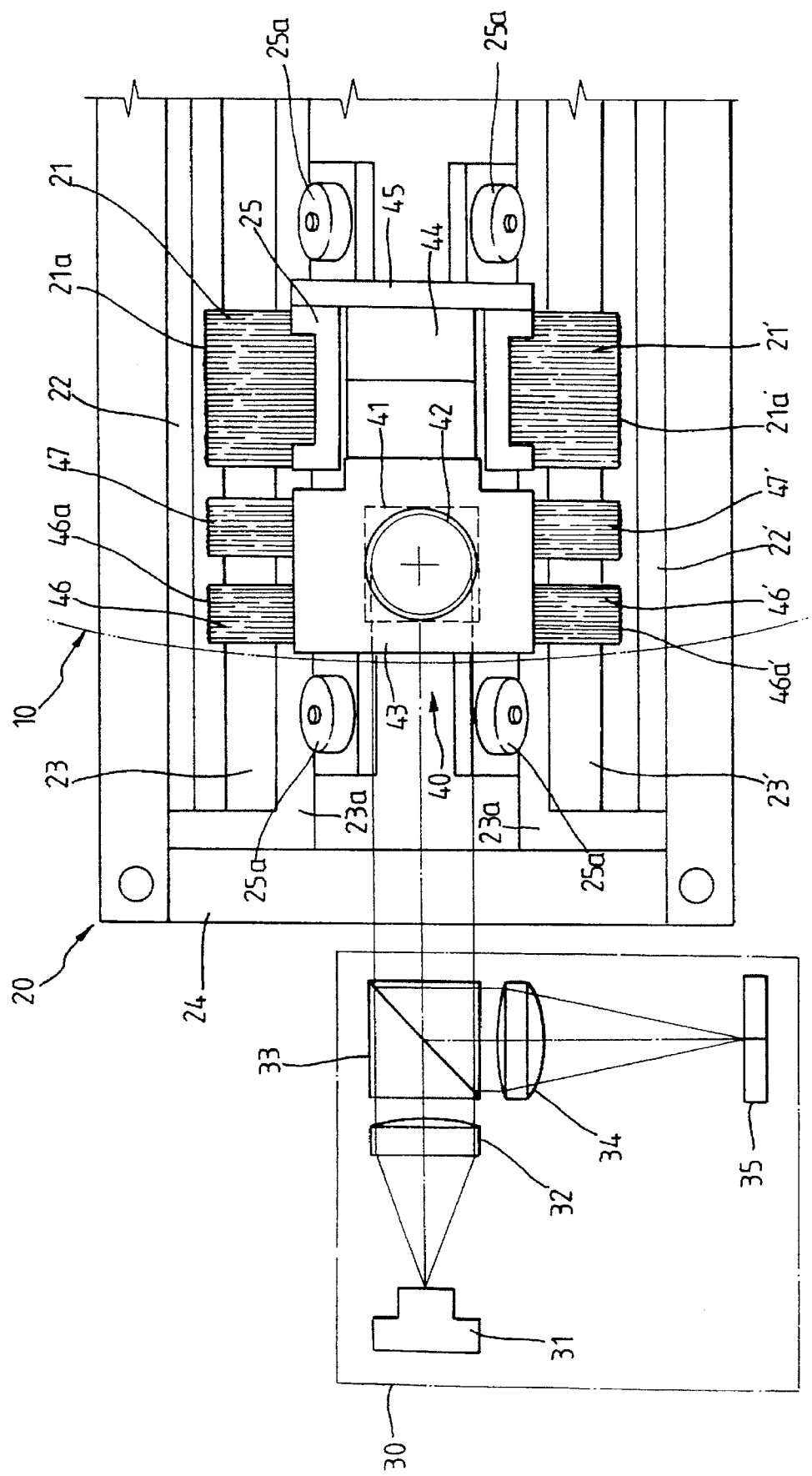
FIG. 2 is a plan view of the optical arrangement and driving mechanism of an optical pickup so as to illustrate the driving method and apparatus of an optical pickup according to the present invention.

Referring to FIG. 2, reference numeral 10 denotes an optical disk which is rotated by a spindle motor (not shown) at a constant velocity. An optical-pickup feeding motor 20 for driving a carriage 25 capable of movement within the radius of optical disk 10, is installed under optical disk 10. Optical-pickup feeding motor 20 is, for instance, a conventional voice coil motor which comprises two moving coils 21 and 21' disposed in parallel on either side of the voice coil motor, magnets 22 and 22' for generating magnetic interlinkage flux to coil portions 25a and 21a' of the respective moving coils 21 and 21', yokes 23 and 23' for forming a magnetic path for flux generated by the respective magnets 22 and 22', and a frame 24 for supporting magnets 22 and 22' and yokes 23 and 23'. Here, having a plurality of wheels 25a, carriage 25 is supported to move on guide rail portions 25a and 25a' of yoke members 23 and 23', and simultaneously is integrally attached to moving coils 21 and 21' located on either side of the carriage, so as to move along with moving coils 21 and 21' to which current is applied for movement.

The optical pickup is divided into fixed portion 30 and moving portion 40. Fixed portion 30 comprises a light source 31 for emitting a light beam, a collimating lens 32 for making the light beam parallel, a beam splitter 33 for separating the beam incident on moving portion 40 from the beam reflected from moving portion 40, a condensing lens 34 for converging the reflected beam, and a photodetector 35 for photoelectrically converting the reflected beam. The fixed portion is fixedly located in an appropriate place. Moving portion 40 comprises a reflecting prism 41 for reflecting the incident beam emitted from fixed portion 30 toward optical disk 10, and an objective lens 42 for converging the incident beam reflected from reflecting prism 41 on optical disk 10. The moving portion is mounted to move along with carriage 25. Here, reflecting prism 41 of moving portion 40 is fixed directly on carriage 25. Objective lens 42 is supported to a fine-seek device for vertical and horizontal fine seeking.

Figure 3:
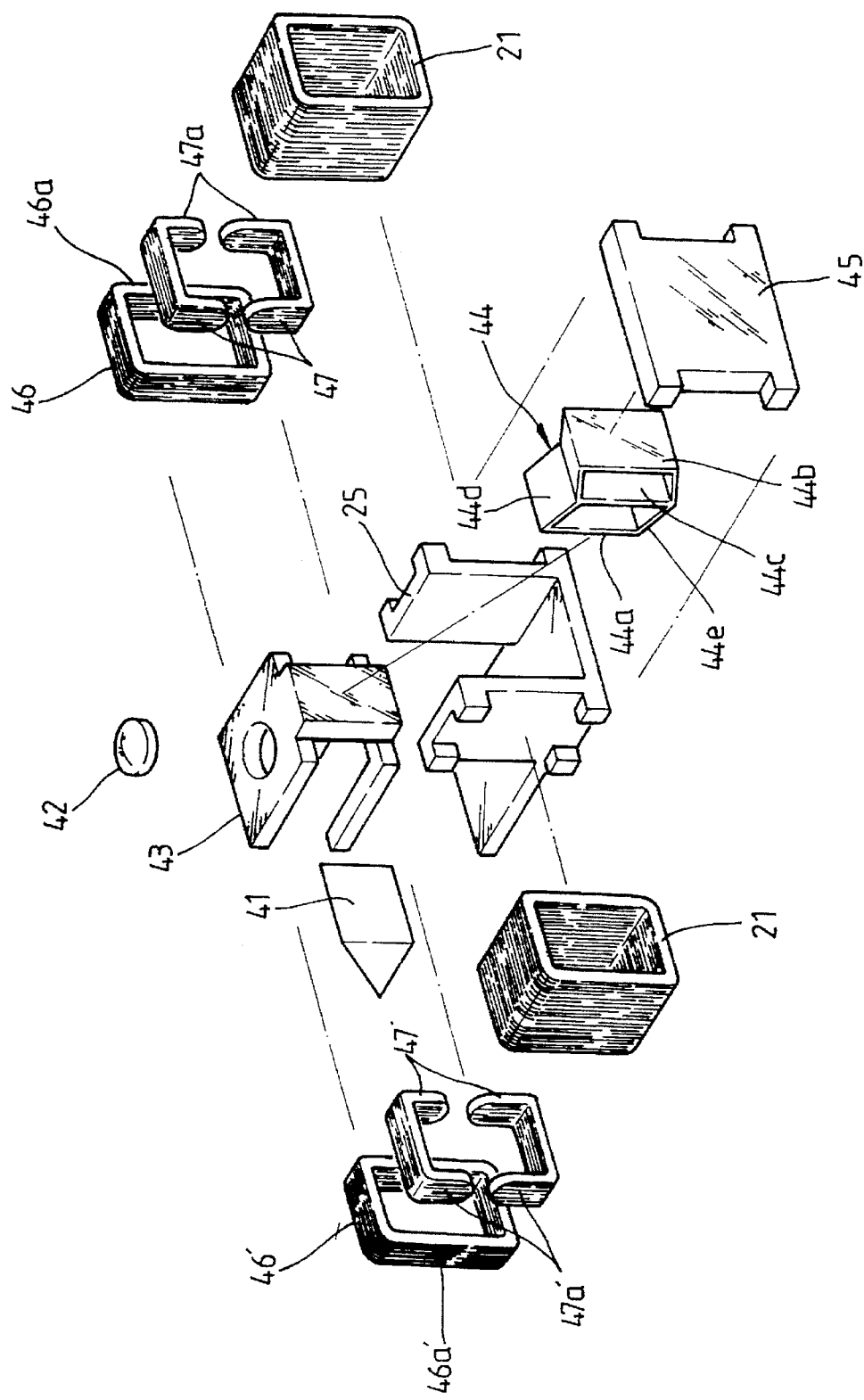
FIG. 3 is an exploded view of the movable portion and the actuator coil for vertical and horizontal driving of the optical pickup shown in FIG. 2.

The fine-seek device, as shown in FIG. 3, comprises a lens holder 43 for supporting objective lens 42, a leaf spring 44 which is elastic vertically and horizontally and biases lens holder 43 so that the holder comes off carriage 25, a spring holder 45 installed on carriage 25 for supporting spring 44, and actuator coils 46, 46', 47 and 47' which are attached to the sides of lens holder 43. In the figure, leaf spring 44 has front and rear surfaces 44a and 44b, an intermediate wall 44c therebetween, and top and bottom surfaces 44d and 44e. The spring edges (their reference numerals are omitted) on which the respective surfaces meet, function as hinges so that front surface 44a moves vertically and horizontally with respect to rear surface 44b. The front and rear surfaces 44a and 44b are adhered to lens holder 43 and spring holder 45, respectively.

Actuator coils 46, 46', 47 and 47' are classified into two horizontal driving coils 46 and 46' and two vertical driving coils 47 and 47'. The coils all are attached to the sides of lens holder 43. Horizontal driving coils 46 and 46' are designed to be completely wound around yoke members 23 and 23' as are moving coils 21 and 21' of feeding motor 20, so as to produce a horizontal electromagnetic force from vertical coil portions 46a and 46a'. Vertical driving coils 47 and 47' are designed to be made up of vertically divided pairs, so that they produce a vertical electromagnetic force from horizontal coil portions 47a and 47a'.

In the embodiment of the present invention, when a predetermined voltage is applied to moving coils 21 and 21' of feeding motor 20 for optical pickup, moving coils 21 and 21' move along yoke members 23 and 23' in the same manner as in the conventional pickup. Here, wheeled carriage 25 to which moving coils 21 and 21' are attached, optical-pickup moving portion 40 mounted on the carriage, and actuator coils 46, 46', 47 and 47' for the objective coil of moving portion 40 all are conveyed together. This allows searching for information by shifting moving portion 40 of the optical pickup to an intended position of the optical disk.

Subsequently, in the same manner as the conventional actuator, if a track/focus error is created in a searched target track of the optical disk, the error is detected from photodetector 35 of fixed portion 30 of the optical pickup. According to the detected error signal, actuator coils 46, 46', 47 and 47' are operated.

Figure 4:
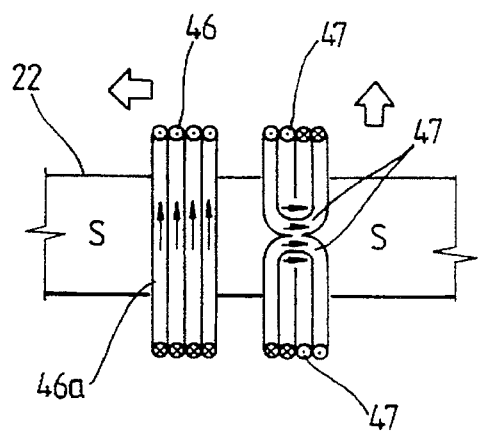
FIG. 4 is a partial cross-sectional view of an actuator of the present invention for illustrating the vertical and horizontal driving principle of the objective lens and FIGS. 5A and 5B are side views of the vertical and horizontal driving states of the objective lens of the present invention.
Figure 5A:
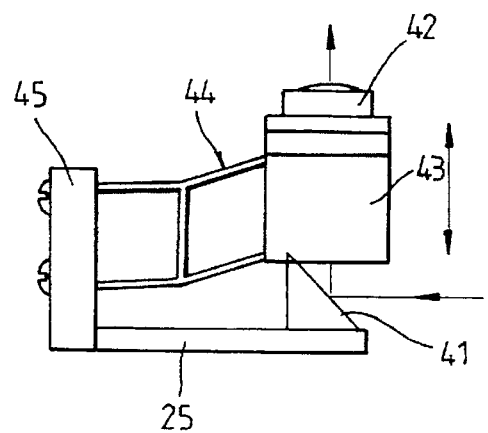
Figure 5B:
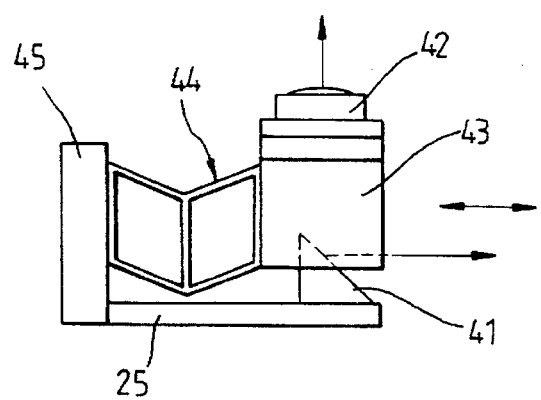

Actuator coils 46, 46', 47 and 47' are operated in the principle shown in FIG. 4. In FIG. 4, given that one pole of magnet 22 of the feeding motor is S pole, when current flows through vertical coil portion 46a of one horizontal driving coil 46 and horizontal coil portion 47a of vertical driving coil 47, which oppose the S magnetic pole, an electromagnetic force is created perpendicular to the direction of the magnetic flux proceeding to the magnetic pole and in the direction of the current flowing through coil portions 46a and 47a, according to Fleming's left hand law. In other words, the horizontal force acts on horizontal driving coil 46 from vertical coil portion 46a, and the vertical force acts on vertical driving coil 47 from horizontal coil portion 47a. Therefore, lens holder 43 to which coils 46, 46', 47 and on which 47' are attached and objective lens 42 is installed, is driven to compensate for the aforementioned track/focus error.

As described above, the optical pickup driving apparatus of the present invention does not employ a permanent magnet and a yoke for driving the fine-seek actuator coils of an objective lens, but shares the magnet and yoke of the conventional feeding motor for the optical pickup. This minimizes the weight of the optical-pickup moving portion by removing the permanent magnet and yoke. Accordingly, the present invention reduces the load of the optical-pickup feeding motor to enhance the response characteristic of the feeding motor and to enable a high-speed search operation. Further, the present invention contributes to the miniaturization of the whole apparatus.

What is claimed is:

1. An apparatus for driving an optical pickup for recording information on and reproducing information from an optical disk, the driving apparatus comprising:

a frame including first and second generally parallel linear permanent magnets producing first and second magnetic fields, respectively, and first and second generally parallel yokes forming respective closed magnetic paths with the first and second linear magnets, respectively;

a carriage movable relative to the frame and including first and second moving coils respectively surrounding the first and second yokes for producing electromagnetic fields in response to electrical currents flowing through the first and second moving coils and thereby moving the carriage parallel to the first and second yokes in response to interaction of the electromagnetic fields and the first and second magnetic fields;

a lens holder flexibly mounted to the carriage for movement transverse to and parallel to the first and second yokes;

first and second parallel driving coils mounted on the lens holder and surrounding the first and second yokes, respectively, for producing parallel driving electromagnetic fields in response to electrical currents flowing through the first and second parallel driving coils and for moving the lens holder parallel to the first and second yokes in response to interaction of the parallel driving electromagnetic fields and the first and second magnetic fields;

first and second transverse driving coils mounted on the lens holder for producing transverse driving electromagnet fields in response to electrical currents flowing through the first and second transverse driving coils and for moving the lens holder transverse to the first and second yokes in response to interaction of the transverse driving electromagnetic fields and the first and second magnetic fields wherein each of the first and second transverse driving coils includes first and second opposed, spaced apart, generally U-shaped parts, the first and second parts generally surrounding a respective yoke and providing for current flow generally parallel to the first and second yokes;

an objective lens mounted on the lens holder for converging light onto an optical disk; and a stationary optical assembly for directing light toward and processing light from the objective lens.

2. The apparatus of claim 1 including a spring mounted on the carriage and the lens holder, flexibly supporting the lens holder for movement parallel to and transverse to the first and second yokes.

3. The apparatus of claim 2 wherein the spring includes a front wall attached to the lens holder, a rear wall attached to the carriage, an intermediate wall between and generally parallel to the front and rear walls, and top and bottom surfaces extending between the front and rear walls, flexibly connected to the front and rear walls and the intermediate wall for movement of the front wall parallel and transverse to the rear wall.

* * * * *